United States Patent [19]
Anhorn et al.

[11] Patent Number: 5,426,453
[45] Date of Patent: Jun. 20, 1995

[54] MEDIA SPACING SYSTEM FOR FIBER OPTIC CATHODE RAY TUBE PRINTER

[75] Inventors: Terry Anhorn, Aurora; Daniel C. O'Brien, Conifer, both of Colo.

[73] Assignee: Alliant Techsystems, Inc., Edina, Minn.

[21] Appl. No.: 304,417

[22] Filed: Sep. 12, 1994

Related U.S. Application Data

[63] Continuation of Ser. No. 931,868, Aug. 18, 1992, abandoned.

[51] Int. Cl.⁶ .......................... G01D 9/42; H04N 1/23
[52] U.S. Cl. .................. 347/226; 358/901.1; 358/302; 355/1; 355/20
[58] Field of Search ............. 358/302, 901.1; 355/1, 355/20; 346/110 R

[56] References Cited

U.S. PATENT DOCUMENTS

| | | | |
|---|---|---|---|
| 3,609,233 | 9/1971 | Nagao | 178/7.2 |
| 3,818,131 | 6/1974 | Emmons | 178/7.85 |
| 4,141,641 | 2/1979 | Nagai | 355/1 |
| 4,694,221 | 9/1987 | Rosier | 315/10 |
| 4,918,467 | 4/1990 | Sanford | 346/110 |

Primary Examiner—Benjamin R. Fuller
Assistant Examiner—Valerie Ann Lund
Attorney, Agent, or Firm—James R. Young

[57] ABSTRACT

A media spacing system for a fiber optic CRT printer. The system has a film coating over the fiber optic portion of the CRT, outside the phosphor display area, which keeps the media a fixed distance from the display area to provide for a uniform display of data on the media. The film may be applied in multiple layers, with each successive layer having a larger size, to create a rounded edge for the coating. A pressure plate is placed on the opposite side of the media from the film coating to keep the media firmly against the film coating. A compliant element, such as foam rubber, attaches the pressure plate to a fixed bracket to allow the pressure plate to adjust for bow and twist of the CRT, while maintaining pressure against the media.

11 Claims, 3 Drawing Sheets

MEDIA SPACING SYSTEM FOR FIBER OPTIC CATHODE RAY TUBE PRINTER

This application is a continuation of application Ser. No. 07/931,868 filed 08/18/92 now abandoned.

FIELD OF THE INVENTION

This invention relates to printers for computer systems and more particularly to Cathode Ray Tube (CRT) display systems within such printers. Even more particularly, the invention relates to an apparatus for displacing print media a distance from a CRT used to expose the print media.

BACKGROUND OF THE INVENTION

Photographic process printers use a cathode ray tube (CRT) to project an image onto a photosensitive media which is being conveyed past the face of the CRT. A fiber optic bundle attached to the CRT conducts the image from the phosphor display area on the face of the CRT to the photosensitive media. After the image is projected onto the media, the media is photographically processed to develop the image.

In order for this image to be recorded in focus and properly positioned on the photosensitive media, the CRT must be accurately aligned to a fixed distance from the media. Prior art devices have placed the media in direct contact with the CRT. If the media is in contact with the fiber optic bundle, however, unwanted artifacts are printed, caused by coupling differences between high spots on either the media or the surface of the fiber optic bundle that cause contact between the media and surface, and low spots on either the media or the fiber optic bundle surface which prevent contact. Keeping the media at a fixed distance from the surface of the fiber optic bundle prevents these artifacts. The distance must be small, however, to preserve focus of the image on the media.

Others have spaced media away from the CRT, however, for different reasons. U.S. Pat. No. 3,818,131 issued Jun. 18, 1974 to Emmons, entitled "Fiber Optic Cathode Ray Tube with Anti-Static Discharge Means" placed transparent tape between the CRT and the media in order to prevent static discharge between the CRT and the media. This static discharge problem was particularly severe in Emmons device because the device used electrostatic copying. In Emmons device, the transparent tape covered the entire display area of the CRT, however, this could interfere with the transmission of light between the CRT and the media. Also, transparent tape may discolor over time, which would interfere with light transmission, and transparent material causes contact artifacts if contact is not complete. Therefore, it is desirable to have an air gap between the display area and the media, rather than a transparent material, to allow the maximum possible light to transfer.

U.S. Pat. No. 3,609,233 issued Sep. 28, 1971 to Nagao entitled "Electron Tube Facsimile Apparatus" provides a separation between the CRT and the media in order to allow the image being projected to the media to also reflect back to a photocell. This separation was provided by a transparent film that moved in unison with the media or transparent material attached to the light-emitting end of the fiber optics. This device has the same limitations as Emmons device in that the transparent material could interfere with light transmission.

It is thus apparent that there is a need in the art for an improved method or apparatus which allows precise spacing between a CRT and media. There is further need for such an apparatus that provide such spacing without covering the phosphor display area to allow the maximum transmission of light. A still further need in the art is for a system to keep the media against the spacer so that the media is kept at a constant distance from the media. The present invention meets these and other needs.

SUMMARY OF THE INVENTION

It is an aspect of the present invention to provide an apparatus for displacing media a distance from a fiber optic cathode ray tube used in a photographic process printer.

It is another aspect of the invention to provide such displacement at a consistent fixed distance from the CRT.

Another aspect is to provide such displacement without interfering with light being conducted to the media through the fiber optic bundle.

Yet another aspect is to provide such displacement without requiring transparent materials.

A further aspect of the invention is to provide a pressure plate to press the media against the displacement system.

A still further aspect is to provide a compliant backing to the pressure plate to allow for bow and twist of the fiber optic CRT.

The above and other aspects of the present invention are accomplished by placing a film coating over the fiber optic bundle portion of the CRT outside the phosphor display area. The film coating keeps the media a fixed distance from the display area to provide for a uniform display of data on the media. The film coating is made of urethane film which forms a low cost and flexible rugged surface which resists media induced scratches and wear. The film may be applied in multiple layers, with each successive layer having a larger size, to create a rounded edge for the coating. This further reduces media scratching and accumulation of dirt and debris.

A pressure plate is placed on the opposite side of the media from the film coating. The plate keeps the media firmly against the film coating, which keeps the media at a fixed distance from the fiber optic bundle of the CRT, the distance being equal to the thickness of the coating. A compliant element, such as foam rubber, attaches the pressure plate to a bracket. The compliant element allows the pressure plate to adjust itself for bow and twist of the CRT, while maintaining pressure against the media.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
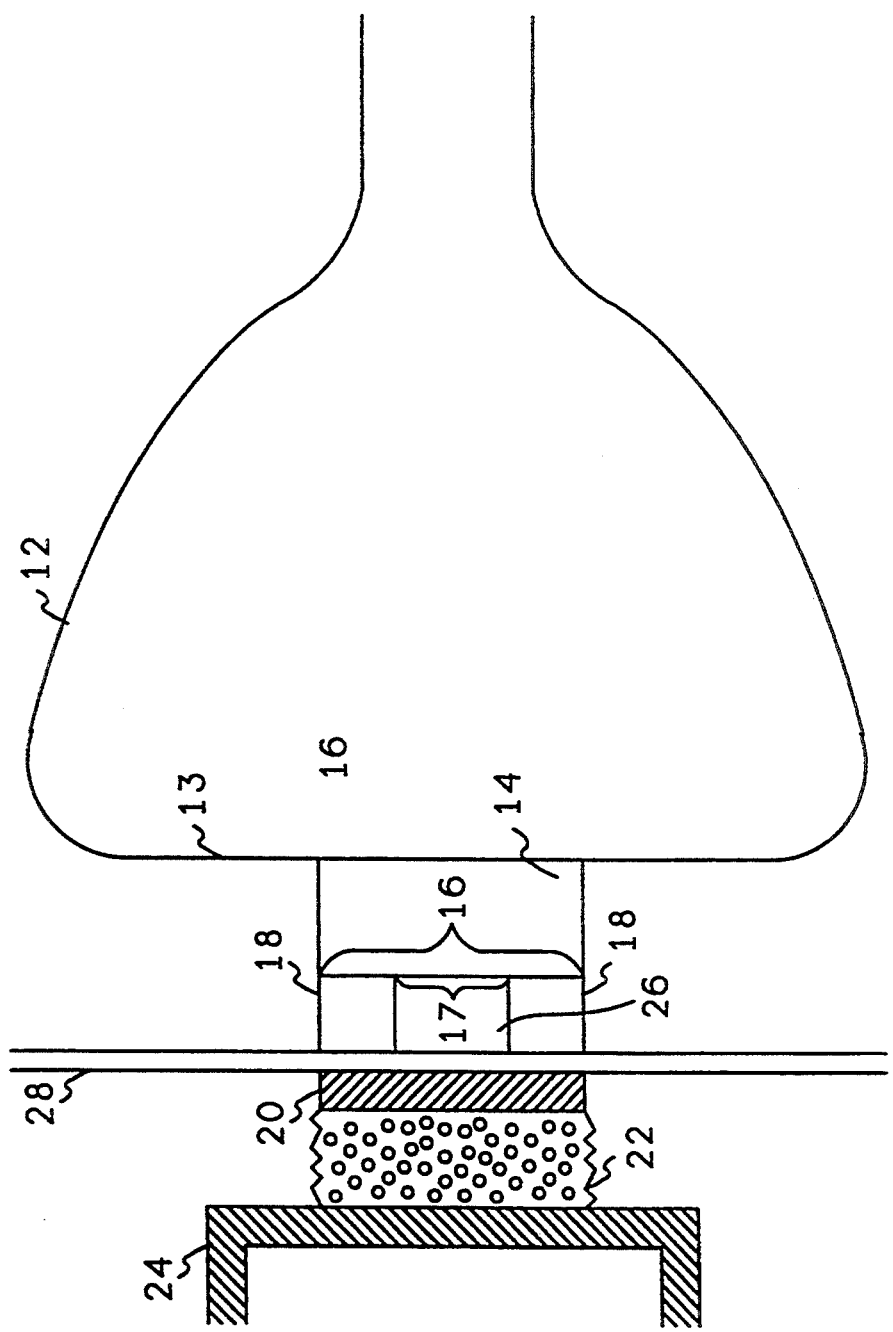
FIG. 1 shows a side view of the spacing system.

FIG. 1 shows a side view of the spacing system of the present invention. Referring now to FIG. 1, a fiber optic CRT 12 is shown having a fiber optic bundle 14 which conducts light from the face 13 of the CRT to a print media 28, for example photographic paper.

The present invention places a film coating 18 over the face 16 of the fiber optic bundle 14 in order to provide an air gap 26 between the surface 16 of the fiber optic bundle 14 and the media 28. If the media 28 is allowed to directly contact the surface 16 of the fiber optic bundle 14, unwanted artifacts are produced within the image on the media. These artifacts appear as intermittent streaks or spots and are caused by coupling differences between high spots on either the surface 16 or the media 28 that cause contact between the media 28 and the surface 16 and low spots which prevent contact between the media 28 and the surface 16. Rather than insure complete media contact with the surface of the fiber optic bundle, the present invention provides a means for insuring that the media remains at a fixed distance from the surface 16 of the fiber optic bundle.

The present invention keeps the media at a fixed distance from the face of the fiber optic bundle by providing the film coating 18 having a defined thickness, and also by providing a semi-rigid pressure plate 20 to keep the media in contact with the film coating 18. Since the CRT and fiber optic bundle may not be perfectly aligned with the media, and some bow or twist may exist, the pressure plate 20 is kept in contact with the media by a compliant material 22, such as foam rubber. Alternatively, a spring mechanism or other compliant material could be used to keep the pressure plate 20 in contact with the media. The compliant foam 22 is attached to a mounting bracket 24 which is itself attached to a movable mechanism used for paper loading, imaging and shuttling, and for cleaning the CRT, but the mounting bracket 24 remains fixed during printing.

The film coating 18 is applied to the fiber optic face plate with a silk screening or spraying process. One example of this type of film is a urethane film silk screened onto the face 16 of the fiber optic bundle 14. The pressure plate 20 may consist, for example, of a thin stainless steel bar. This allows the pressure plate to be flexible enough for the horizontal, long, axis to conform to any bow present on the fiber optic bundle face and yet be rigid enough in the vertical, short, axis to bridge the gap 26 across the film coating without allowing media contact with the surface 16 of the fiber optic bundle 14. Another example of a pressure pad that would work in this environment is a plastic material pressure pad mounted on foam.

Figure 2:
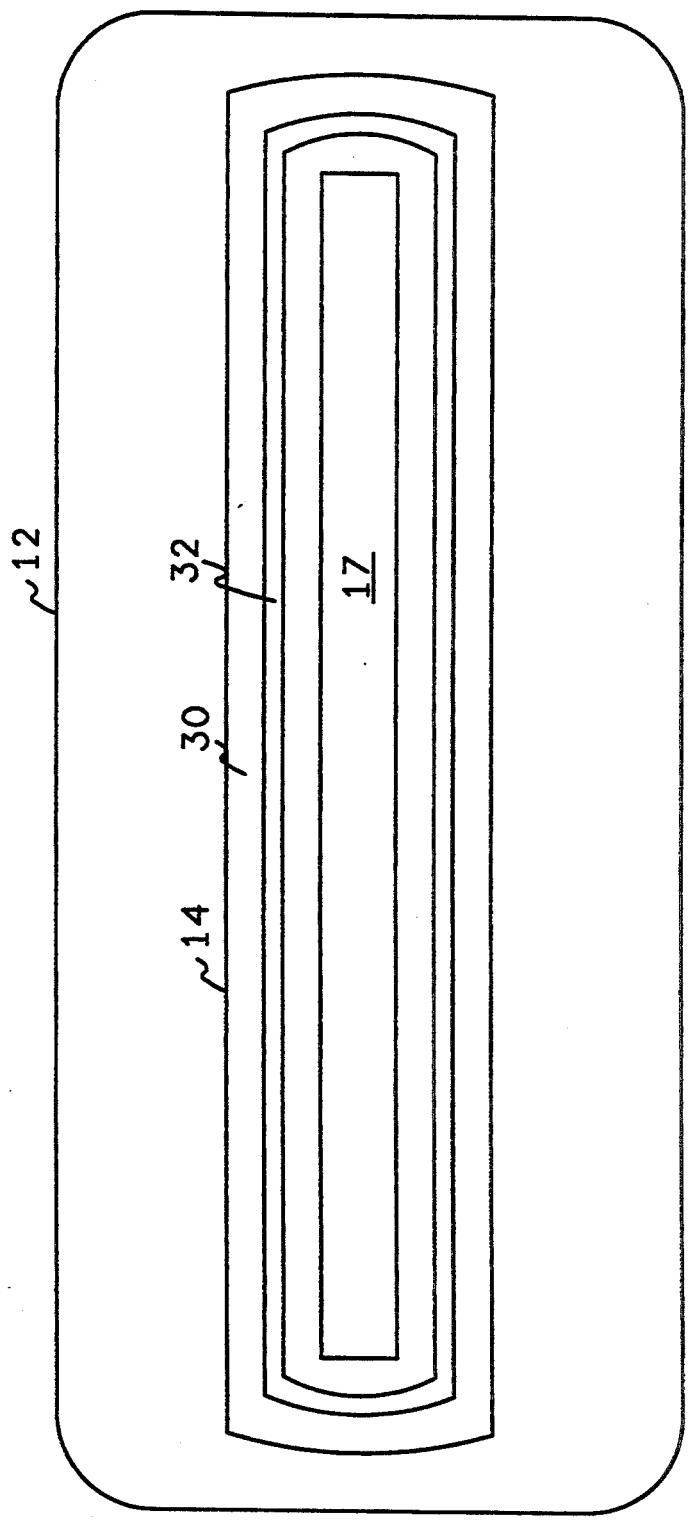
FIG. 2 shows a front view of the system.

FIG. 2 shows a front view of the system of the present invention. Referring now to FIG. 2, the CRT 12 is shown having the fiber optic bundle 14 mounted at its center. Within the fiber optic bundle 14, is the phosphor display area 17 (also shown in FIG. 1) on the surface 16 (shown in FIG. 1) of the fiber optic bundle 14. The film coating is deposited around the phosphor display area on the surface 16, but not covering it. FIG. 2 shows that the film coating may be deposited as two layers, one deposited on top of the other. A first layer 30, is the smaller layer deposited directly onto the surface 16 of the fiber optic bundle 14. A second layer 32, larger in size than the first layer 30, is deposited on top of the layer 30. Having two layers of different sizes, deposited in this manner, provides rounded edges to the film coating. These rounded edges reduce wear on both the media and the film coating, as well as reducing the accumulation of dirt and debris around the film coating.

Figure 3:
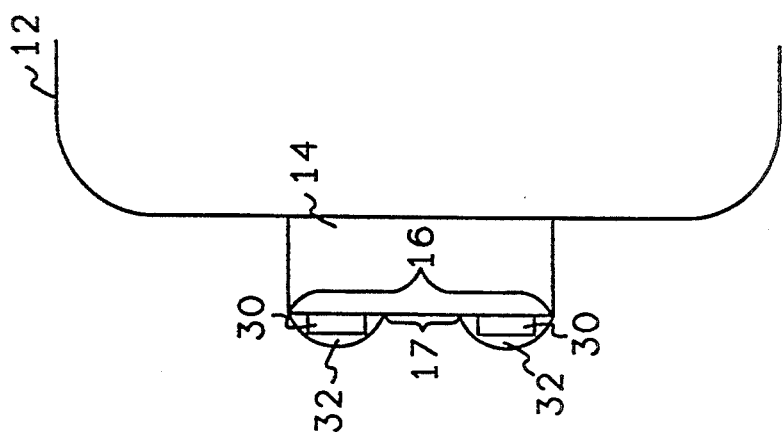
FIG. 3 shows a side view illustrating a multi-layered film coating.

FIG. 3 shows a side view illustrating the multi-layered film coating shown in FIG. 2. Referring now to FIG. 3, the CRT 12 is shown having the fiber optic bundle 14. Deposited on the surface 16 of the fiber optic bundle 14 are the two layers, 30 and 32, also illustrated above with respect to FIG. 2. FIG. 3 illustrates that the outer layer 32 is larger in size than the inner layer 30, thus, providing the rounding effect. Although FIGS. 2 and 3 show only two layers being deposited, any number of layers could be used to create a more rounded effect, for example a single layer of sprayed on film has been used to provide a satisfactory rounded effect. Also, other methods could be used to provide the rounding effect.

Having thus described a presently preferred embodiment of the present invention, it will now be appreciated that the aspects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. Apparatus for displacing media a fixed distance from a fiber optic cathode ray tube, said apparatus comprising:
   a film coating, having a thickness equal to said fixed distance, deposited adjacent to a phosphor display area of a fiber optics bundle of said fiber optic cathode ray tube wherein said film coating does not cover said phosphor display area; and
   means for pressing said media against said film coating.

2. The apparatus of claim 1 wherein said means for pressing said media against said film coating further comprises:
   a mounting bracket located in proximity to said film coating on an opposite side of said media;
   pressure plate means located adjacent said media on a side of said media opposite said film coating and located to press said media against said film coating; and
   compliant means connecting said pressure plate means to said bracket.

3. The apparatus of claim 1 wherein said film coating further comprises:
   at least one layer applied to said fiber optics bundle of said fiber optics cathode ray tube, wherein a first layer of said at least one layer is applied outside a phosphor display area and wherein each layer subsequent to said first layer is deposited on a previous layer.

4. The apparatus of claim 3 wherein each successive layer has a larger surface area than an immediately preceding layer.

5. The apparatus of claim 1 wherein said film coating further comprises:
   a first layer applied to said fiber optics bundle of said fiber optics cathode ray tube, wherein said first layer is applied outside a phosphor display area; and
   a second layer applied over said first layer, said second layer having a dimension larger than a dimension of said first layer.

6. A method for displacing media a fixed distance from a fiber optic cathode ray tube, said method comprising the steps of:
   (a) depositing a film coating adjacent to a phosphor display area of a fiber optics bundle of said fiber optic cathode ray tube, wherein a thickness of said film coating is equal to said fixed distance and wherein said film coating does not cover said phosphor display area; and
   (b) pressing said media against said film coating.

7. The method of claim 6 wherein step (b) further comprises the steps of:
   (b1) mounting bracket in proximity to said film coating on an opposite side of said media;
   (b2) connecting a compliant material to said bracket; and
   (b3) connecting a pressure plate to said compliant material and placing said pressure plate adjacent said media on a side of said media opposite said film coating, said pressure plate being placed to press said media against said film coating.

8. The method of claim 6 wherein step (a) further comprises the step of:
   depositing said film coating as at least two layers, wherein a first layer of said at least two layers is applied outside said phosphor display area so as to not cover said phosphor display area and each subsequent layer is deposited on a previous layer.

9. The method of claim 8 wherein each successive layer applied has a larger surface area than an immediately preceding layer.

10. The method of claim 6 wherein step (a) further comprises the steps of:
    (a1) depositing a first layer on a surface of said fiber optics bundle of said fiber optics cathode ray tube, and depositing said first layer outside a phosphor display area of said fiber optics bundle; and
    (a2) depositing a second layer over said first layer, said second layer having a dimension larger than a dimension of said first layer.

11. Apparatus for displacing media a fixed distance from a fiber optic cathode ray tube, said apparatus comprising:
    a film coating, having a thickness equal to said fixed distance, deposited adjacent to a phosphor display area of a fiber optics bundle of said fiber optic cathode ray tube comprising
       a first layer applied to said fiber optics bundle of said fiber optics cathode ray tube, wherein said first layer is applied outside a phosphor display area so as to not cover said phosphor display area; and
       a second layer applied over said first layer, said second layer having a surface area larger than a surface area of said first layer; and
    means for pressing said media against said film coating comprising
       a mounting bracket located in proximity to said film coating on an opposite side of said media,
       a pressure plate located adjacent said media on a side of said media opposite said film coating and located to press said media against said film coating, and
       compliant material connecting said pressure plate to said bracket.

* * * * *